J. W. McCALLUM.
VEHICLE WHEEL.
APPLICATION FILED APR. 24, 1909.
1,033,185.
Patented July 23, 1912.
2 SHEETS—SHEET 1.
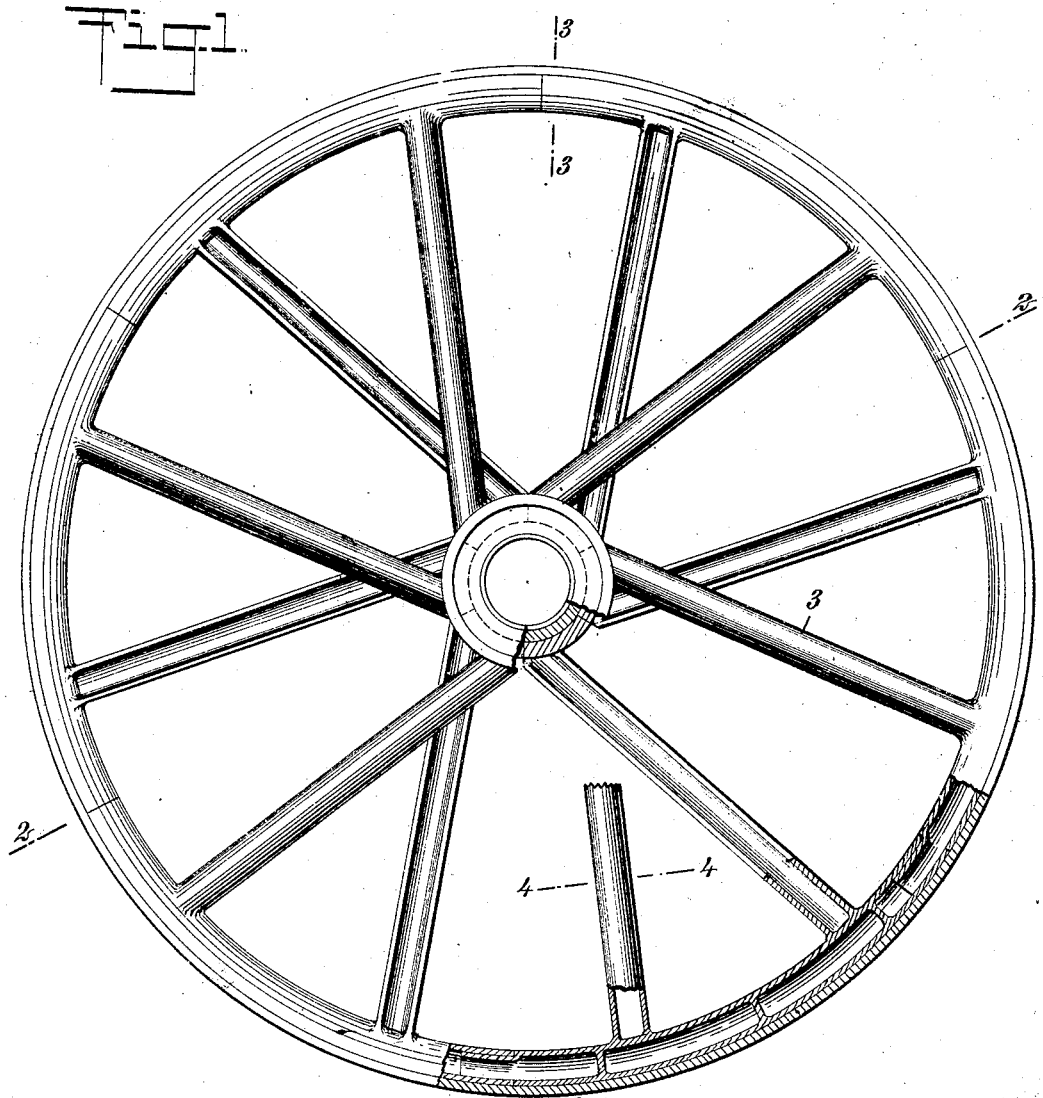
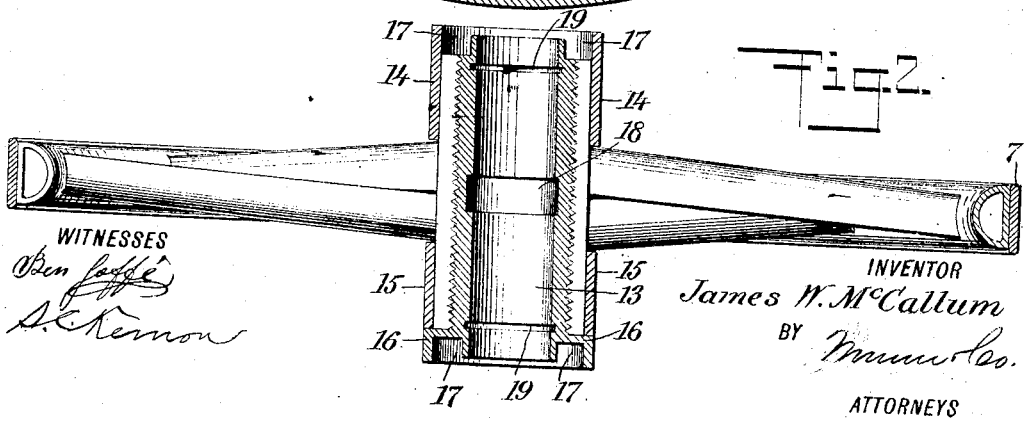
WITNESSES
INVENTOR
James W. McCallum
BY
ATTORNEYS

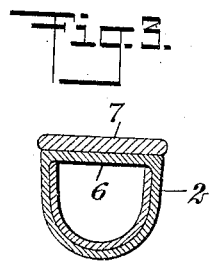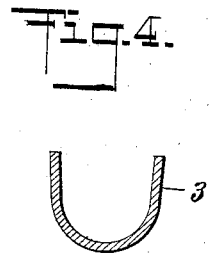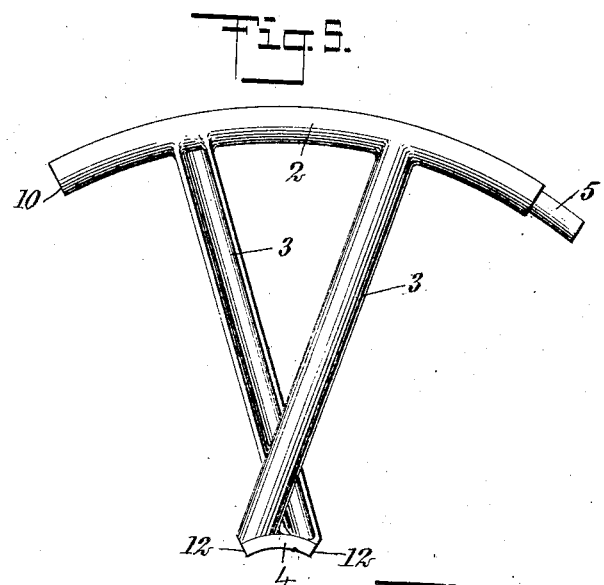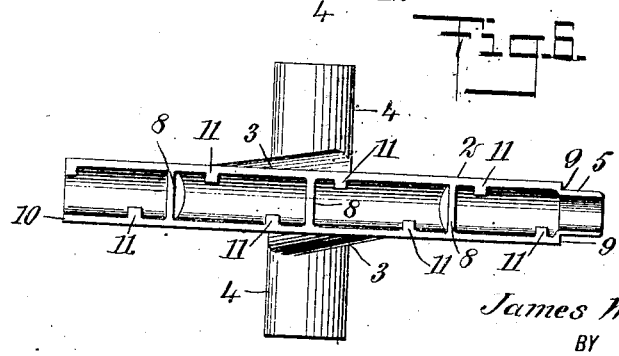

UNITED STATES PATENT OFFICE.

JAMES WARNER McCALLUM, OF PLYMOUTH, INDIANA.

VEHICLE-WHEEL.

1,033,185.     Specification of Letters Patent.     Patented July 23, 1912.

Application filed April 24, 1909. Serial No. 491,894.

*To all whom it may concern:*

Be it known that I, JAMES WARNER MC-CALLUM, a citizen of the United States, and resident of Plymouth, county of Marshall, State of Indiana, have invented a certain new and useful Vehicle-Wheel, of which the following is a full description.

Among the principal objects which this invention has in view are:—to construct a vehicle wheel from segments adapted to be assembled and bound together to form a continuous wheel: to form the said segments so that the members thereof are integrally related; to obtain the maximum rigidity with the minimum weight; and to simplify the construction.

One embodiment of the present invention is shown in the accompanying drawings, wherein like characters of reference designate corresponding parts in all the views.

Figure 1 is a side elevation of a wheel constructed in accordance with this invention. In this view a portion of the hub and a portion of the felly are cut away to show the interior construction. Fig. 2 is a cross section of the same through one of the diameters taken on the line 2—2 in Fig. 1. Fig. 3 is a cross section through the felly, taken on the line 3—3 in Fig. 1. Fig. 4 is a cross section of the spokes taken on the line 4—4 in Fig. 1. Fig. 5 is a side view of one of the segments of which this wheel is composed. Fig. 6 is a top view of a modified form of the construction embodying this invention.

In the above mentioned drawings, the numeral —2— indicates a segment of the felly.

The numeral —3— indicates the spokes.
The numeral —4— indicates the hub segments.

The numeral —5— indicates the extension by which the felly segments are joined.

In the construction shown in the drawings, the segments are constructed from the sixth part of the wheel. Each segment is shown as carrying two spokes. It will be understood that the proportionate size of these segments may be increased or de-creased without passing beyond the scope of this invention. It is desirable—(though not essential)—that the segments should be in equal divisions of the entire wheel. By having the segments reduced to the dimension shown, a desirable purpose is here effected, to-wit:—that when a portion of the wheel is damaged one of the segments receiving the damage may be removed and replaced. If this replaced segment be small, the necessary labor connected with the removal and replacement is diminished.

The segments from which this wheel is formed are preferably constructed of cast iron, which may be annealed or not, as desired. To obtain the maximum strength, with lightness of construction, the structural form adopted for both the spokes and felly is that of a hollow half cylinder. In Fig. 3 of the drawings there is shown a cross section of the felly; and in Fig. 4 is shown a cross section of one of the spokes. The preferred form of the felly is that provided with the face or bridge —6— to receive the tire —7—. The felly is reinforced by the cross ribs —8—8— at suitable intervals. The segments of the felly are provided at the one end with an extension —5—. This extension is open outwardly and has an exterior shape to fit within the channel formed by the interior of the felly —2—. At the point of extension a shoulder —9— is formed, and if need be, this shoulder may be suitably machined to form a close joint with the squared faces —10— of the end of the segment not bearing the extension —5—.

In Fig. 6 of the drawings, there is shown a view of the felly in which an alternative construction is illustrated. The said alternative construction here shown consists in omitting the face or bridge —6— and substituting therefor at suitable and desired intervals the bracketed extensions —11—11—, which are provided to receive the tire —7— in lieu of the said bridge —6—. A certain proportion of lightness in construction is thus gained.

The spokes —3— are preferably formed to the construction shown in Fig. 4—. It will be understood, however, that should a tubular or bridged construction be preferred, closing or bridging the opening between the straight legs of the "U", this may be accomplished without altering the spirit of this invention. In arrangement, the spokes —3— are joined to the felly —2— on the central line thereof, and in such position that the hollow of each spoke faces that of the other spoke. At the lower end the spokes are joined to the hub, but at either side of the longitudinal center of the hub. The lines of extension of the spokes —3— —3— are tangential to the hub, as shown in the drawings.

The hub segments —4— are of the same relative proportion to the completed hub that the felly segments are to the completed wheel. The segments —4— are cylindrical in shape with surfaces —12—, parallel with the faces —10— of the segments —2—. The surfaces —12— may be machined to fit closely when assembled. The inner surface is provided with a screw thread intended to receive a hub —13—. The thread may be produced in each segment when the same is cast, or it may be cut after the segments are assembled and then held rigidly in position. The segments thus constructed are assembled by nesting the segments —4— of the hub and the extensions —5— within the channel of the adjacent felly segment. It will be noted that the segments are so constructed that they can be brought together on radial lines, the parts fitting without obstruction.

When assembled, the parts are held together by the tire —7— and the hub bands —14— and —15—. The bands —14— and —15— are given a drive fit, drawing the hub sections —4— closely together. The same is true of the tire —7—. The bearing —13— is then introduced by being screwed into the opening formed by the hub sections —4—, screw threads having been provided on the outer surface of the said bearing and on the inner surface of the hub section. This screw thread engagement secures perfect alinement of the hub segments and prevents disadjustment of the same laterally.

The bearing —13— is provided with an annular extention —16—, the diameter of which equals the outer diameter of the collar —15—, and is adapted to strike upon and hold the said collar in position when the hub bearing has been forced forward against the said collar and hub sections. The inner surface of the bearing —13— is extended to form sand grooves —17—. The collar —14— may be held in position by any suitable construction, or the wheel nut may be provided with a flange to bear against the outer edge of the said collar as it does against the bearing —13—. The lubricating devices employed in the bearing —13— are of the usual form and style. That shown in the present construction employs a central chamber —18—, from which may extend inclined distribution grooves leading to end dust guard grooves —19—19—. This chamber —18— may be provided with any suitable oiling inlet.

The tire —7— is a continuous band. It may be heated and shrunk upon the felly as is at present done in wheels having wood fellies. If this method is followed, precaution should be taken to warm the felly sufficiently to avoid too suddenly chilling the tire when placed in contact therewith. Any other suitable method of securing the tire upon the felly may be employed.

The construction herein shown and described, provides a sectional metal wheel without bolts or rivets or riveting to loosen, weaken and impair the durability of the wheel. Furthermore, the object in arranging the spokes tangentially is to give the wheel a brace within itself longitudinally that a direct spoked wheel does not have and which effectually prevents the twisting of the hub within the wheel. Also by reason of the crossing of the spokes of each section and their being together for several inches from the hub, renders the spokes as stiff (by bracing each other) at that point as though they left the hub there, i. e., several inches from the hub, which in effect makes the hub extend from the crossing of the spokes on one side of the hub to the crossing of the spokes on the opposite side of the hub, greatly increasing the size of the hub and correspondingly decreasing the length of the spokes and thereby increasing the strength of the wheel.

Having thus described this invention, what is claimed is:—

A metallic wheel comprising a plurality of wheel segments, each of said segments embodying a section of a hollow felly, and a section of a hub, said sections forming arcs of the same sector of the completed wheel, the arc formed by the felly section being equal in length to two spaces between the spokes of said wheel where the same are joined to said felly, said hub sections being provided with parallel pitched grooves forming sections of an internal screw threaded cylinder when all of said hub sections are united, said felly and hub sections being united by two spokes integrally formed with said sections, said spokes being channeled and opening transversely of the said segments, and said spokes being disposed in mutually crossed relation and tangential to the completed wheel hub, said spokes being connected with the said felly section at the first and third quarter sections of the length of the said felly section; a plurality of binding rings encompassing said hub sections to hold the same in cylindrical disposition; a screw threaded hub bearing adapted to engage the said hub sections in threaded relation; and means for holding the said rings in position on the completed hub.

In testimony whereof, I have hereunto set my hand in the presence of witnesses this 17th day of April 1909.

JAMES WARNER McCALLUM.

Witnesses:
 MANUEL O. ROARK,
 GEORGE F. HITCHCOCK.

Copies of this patent may be obtained for five cents each, by addressing the "Commissioner of Patents, Washington, D. C."